US007639475B2

(12) United States Patent
Ro et al.

(10) Patent No.: US 7,639,475 B2
(45) **Date of Patent: *Dec. 29, 2009**

(54) ELECTRODE MATERIAL AND METHOD FOR PRODUCING SAME

(75) Inventors: Akinori Ro, Osaka (JP); Zenya Ashitaka, Osaka (JP); Hiroshi Tada, Osaka (JP)

(73) Assignee: Toyo Aluminium Kabushiki Kaisha, Osaka (JP)

( * ) Notice: Subject to any disclaimer, the term of this patent is extended or adjusted under 35 U.S.C. 154(b) by 140 days.

This patent is subject to a terminal disclaimer.

(21) Appl. No.: 11/663,154

(22) PCT Filed: Sep. 8, 2005

(86) PCT No.: PCT/JP2005/016495

§ 371 (c)(1), (2), (4) Date: Mar. 19, 2007

(87) PCT Pub. No.: WO2006/035579

PCT Pub. Date: Apr. 6, 2006

(65) Prior Publication Data

US 2008/0130202 A1 Jun. 5, 2008

(30) Foreign Application Priority Data

Sep. 29, 2004 (JP) ............................ 2004-283268

(51) Int. Cl.
*H01G 9/04* (2006.01)
*H01G 9/145* (2006.01)

(52) U.S. Cl. ...................................... 361/516; 361/532

(58) Field of Classification Search ................. 361/516, 361/532

See application file for complete search history.

(56) References Cited

U.S. PATENT DOCUMENTS 3,697,303 A * 10/1972 Busch et al. ................ 427/536
5,777,428 A * 7/1998 Farahmandi et al. ........ 313/352
7,327,556 B2 * 2/2008 Ro et al. ..................... 361/502
7,388,740 B2 * 6/2008 Ro et al. ..................... 361/523
2004/0064155 A1 * 4/2004 Norton et al. .................. 607/5

FOREIGN PATENT DOCUMENTS

JP 4-71213 A 3/1992
JP 2000-91161 A 3/2000
JP 2000-164466 A 6/2000
WO WO 2004087984 A1 * 10/2004
WO WO 2004088690 A1 * 10/2004

* cited by examiner

*Primary Examiner*—Eric Thomas
*Assistant Examiner*—David M Sinclair
(74) *Attorney, Agent, or Firm*—Birch, Stewart, Kolasch & Birch, LLP

(57) ABSTRACT

An electrode material which can secure both high electrical capacity and high stability with time and an be improved in the adhesion of a conductive material wherein the electrode material includes an aluminum foil, a carbon-containing layer formed on the surface of the aluminum foil, and an interposition layer containing an aluminum element and a carbon element formed between the aluminum foil and the carbon-containing layer.

7 Claims, 4 Drawing Sheets

22
2
21
3
1

1
2
2
3
3
3
3
21
21
21
21

2
22
22
21
3
1
23
25
24
25
23
21

ELECTRODE MATERIAL AND METHOD FOR PRODUCING SAME

TECHNICAL FIELD

This invention relates to an electrode material and to a method for producing the electrode material, and in particular, to an electrode material using an aluminum foil as a base material and to a method for producing the electrode material. Specifically, this invention relates to an electrode material such as a capacitor cathode foil constituting the cathode of a nonaqueous electrolyte electrolytic capacitor and a material constituting the electrode of a cell and an electrode collector and to a method for producing the electrode material.

BACKGROUND ART

For example, a capacitor is provided with two electrodes, that is, an anode and a cathode. As the anode material, valve metals such as aluminum and tantalum on which surface an insulating oxide film can be formed are used. As the cathode material, any of electrolytes, inorganic semiconductors, organic conductive materials and metal thin films may be used. When the cathode material is an electrolyte, an aluminum foil having an enlarged surface area as the cathode terminal is frequently used. This type of aluminum foil is called an aluminum foil for electrolytic capacitor cathode. The surface area of a cathode aluminum foil is enlarged to increase the electrical capacity of a capacitor.

In the meantime, a nonaqueous electrolyte is used in an aluminum electrolytic capacitor having a proof temperature exceeding 105° C. The nonaqueous electrolyte is different from an ethylene glycol-water type electrolytic solution having 10% or more of water and means an electrolyte in which water is not contained at all or is contained in an amount of 5% or less if contained. In an aqueous electrolytic solution, water contained therein is electrodialyzed when voltage is applied to a capacitor with the result that the produced hydroxyl ions are combined with cationic ammonium ions or amidinium ions on the cathode side to generate alkali compounds. For this, the cathode foil is corroded in the capacitor which causes reduced capacity as a change with time. It is therefore demanded of an aqueous electrolyte aluminum electrolytic capacitor to have stability with time as its characteristics. Similarly, it is also demanded of a nonaqueous electrolyte aluminum electrolytic capacitor to have stability with time.

Therefore, the cathode aluminum foil needs to have stability with time besides high electrical capacity as the characteristics to be required.

In order to increase the electrical capacity of the cathode aluminum foil, a method is usually adopted in which the surface area of the aluminum foil is enlarged by etching. However, since the surface of the aluminum foil etched is merely coated with a natural oxide film, there is a problem that the electrical capacity deteriorates during contacting with the electrolyte for a long period of time.

An electrode whose surface is enlarged by allowing a carbon powder to adhere to the surface of an aluminum foil has been developed. In the publication of Japanese Patent Application Laid-Open (JP-A) No. 2000-164466 (Patent Reference 1), a method is disclosed in which a collector of an aluminum foil is provided with an intermediate film of carbon or an intermediate layer of a metal nobler than an aluminum foil and an active material layer such as carbon layer is applied to the intermediate layer.

However, even if the above production method is used, the obtained cathode foil has insufficient adhesion between the carbon powder and the aluminum foil. Therefore, there may be sometimes a phenomenon that the carbon powder is peeled from the surface of the aluminum foil when the capacitor is charged or discharged occurs. As a result, there is the problem that the stability of the capacitor deteriorates with time.

Also, an improvement in the adhesion between the carbon powder as a conductive material and the aluminum foil is an essential technical theme to impart conductivity to not only capacitor electrode materials but also electrode materials constituting battery electrodes such as a positive electrode of a lithium ion battery and electrode collectors. For example, when the carbon powder is adsorbed to the aluminum foil by using a general binder according to conventional technologies, since the internal resistance of the positive electrode increase, there is a problem that the time required to charge a lithium ion battery is longer.

Patent Document 1: Publication of JP-A No. 2000-164466

DISCLOSURE OF THE INVENTION

Problems to be Solved by the Invention

It is an object of this invention to provide an electrode material which can ensure both a high electrical capacity and high stability with time and can improve the adhesion of a conductive material, and also to provide a method for producing the electrode material.

Means for Solving the Problems

The inventors of this invention have made earnest studies to solve the problems of Background Art and as a result, found that an electrode material which can attain the above object can be obtained by subjecting an aluminum foil to specific treatment. This invention was thus completed based on the findings of the inventors.

An electrode material according to this invention includes an aluminum foil and a carbon-containing layer formed on the surface of the aluminum foil. An interposition layer containing an aluminum element and a carbon element is formed between the aluminum foil and the carbon-containing layer.

In the electrode material of this invention, the carbon-containing layer has the function of enlarging or increasing the surface area of the aluminum foil. This increases the electrical capacity when the electrode material of this invention is used for a capacitor cathode foil. Also, since the interposition layer containing an aluminum element and a carbon element is formed between the aluminum foil and the carbon-containing layer, this interposition layer has the function of enhancing the adhesion to the carbon-containing layer which increases the surface area of the aluminum foil. A specified high electrical capacity and high stability with time can be thereby secured in the case of using the electrode material of this invention for a capacitor cathode foil. Also, when the electrode material of this invention is used for battery electrodes or electrode collectors, the adhesion of the conductive material that imparts conductivity can be improved.

In the electrode material according to this invention, the carbon-containing layer preferably contains an interposition material having an aluminum element and a carbon element inside.

When the carbon-containing layer is thin, the adhesion between the aluminum foil and the carbon-containing layer can be improved by only the presence of the above interposition layer. However, when the carbon-containing layer is thick, peeling is caused inside of the carbon-containing layer and there is therefore the possibility that a specified electrical capacity is not obtained. In this case, the adhesion in the carbon-containing layer can be improved by forming the interposition material containing aluminum and carbon inside of the carbon-containing layer, and a specified high electrical capacity can be secured when the electrode material of this invention is used for a capacitor cathode foil. Also, when the electrode material of this invention is used for a battery electrode or an electrode collector, the adhesion of the conductive material that imparts conductivity can be improved even if a thick carbon-containing layer is formed.

In the electrode material of this invention, the carbon-containing layer is preferably formed so as to extend outward from the surface of the aluminum foil. In this case, the carbon-containing layer produces the ability to enlarge or increase the surface area of the aluminum foil more effectively.

Also, in the electrode material of this invention, the interposition layer preferably constitutes a first surface part containing carbide of aluminum and formed in at least a part of the surface of the aluminum foil. The carbon-containing layer preferably constitutes a second surface part formed so as to extend outward from the first surface part.

In this case, the second surface part has the function of increasing the surface area of the aluminum foil without deteriorating the strength of the aluminum foil. This increases the electrical capacity of the electrode material. Also, since the first surface part containing a carbide of aluminum is formed between the aluminum foil and the second surface part, this first part has the function of enhancing the adhesion to the second surface part which increases the surface area of the aluminum foil. Therefore, when the electrode material of this invention is used for a capacitor cathode foil, a specified high electrical capacity and high stability with time can be secured. Also, when the electrode material of this invention is used for a battery electrode or an electrode collector, the adhesion of the conductive material that imparts conductivity can be improved.

Also, it is preferable that the carbon-containing layer further contain particles containing a carbon-containing material on at least the outermost layer thereof and the second surface part be formed between the first surface part and the above particles and contain a carbide of aluminum. In this case, even if a thick carbon-containing layer is formed, the adhesion between the carbon-containing layer and aluminum can be retained without fail.

The above particles preferably contain at least one type selected from the group consisting of carbon particles and particles provided with a carbon-containing material stuck to the outermost layer thereof in advance.

Moreover, the carbon-containing layer preferably contains aluminum particles in addition to the above particles and further contains an aluminum particle surface part which is formed on at least a part of the aluminum particle and contains a carbide of aluminum and an aluminum particle outside part which has a carbide of aluminum and is formed so as to extend to the outside of the surface of the aluminum particle from the aluminum particle surface part. In this case, the adhesion in the inside of the carbon-containing layer can be improved, making it possible to prevent peeling even if a thicker carbon-containing layer is formed.

The carbon-containing layer may contain aluminum particles in place of the above particles and further contain an aluminum particle surface part which is formed on at least a part of the aluminum particle and contains a carbide of aluminum and an aluminum particle outside part which has a carbide of aluminum and is formed so as to extend to the outside of the surface of the aluminum particle from the aluminum particle surface part, and the second surface part may be formed between the first surface part and the aluminum particles and may contain a carbide of aluminum. In this case, a carbon-containing layer having a large surface area per unit projected area can be formed.

The electrode material having any one of the above characteristics is preferably a capacitor cathode foil. Also, the above capacitor cathode foil is preferably used in a nonaqueous electrolyte capacitor which uses a nonaqueous electrolyte. In this case, a nonaqueous electrolyte electrolytic capacitor which can secure both high electrical capacity and high stability with time can be obtained.

A method for producing an electrode material according to this invention comprises the steps of disposing an aluminum foil in a space containing a hydrocarbon-containing material and heating the aluminum foil.

In the production method of this invention, the aluminum foil disposed in a space including a hydrocarbon-containing material is heated, thereby making it possible to form an interposition material containing an aluminum element and a carbon element and also to easily form a carbon-containing layer having the function of increasing the surface area of the aluminum foil.

In the method for producing an electrode material according to this invention, the step of disposing the aluminum foil preferably comprises the step of making at least one type selected from the group consisting of a carbon-containing material and an aluminum powder to adhere to the surface of the aluminum foil and then disposing the aluminum foil in a space including a hydrocarbon-containing material in.

Specifically, in the step of disposing the aluminum foil in the production method of this invention, the aluminum foil may be disposed in a space including the hydrocarbon-containing material after the carbon-containing material is made to adhere to the surface of the aluminum foil, the aluminum foil may be disposed in a space including the hydrocarbon-containing material after the aluminum powder is made to adhere to the surface of the aluminum foil or the aluminum foil may be disposed in a space including the hydrocarbon-containing material after the carbon-containing material and the aluminum powder are made to adhere to the surface of the aluminum foil.

In the case of using the electrode material of this invention for a capacitor cathode foil, an electrode material having both higher electrical capacity and more stability with time than conventional materials can be obtained by heating the aluminum foil disposed in a space including a hydrocarbon-containing material. However, in order to obtain an electrode material provided with an outstandingly higher electrical capacity, after at least one type selected from the group consisting of a carbon-containing material and an aluminum powder is made to adhere to the surface of the aluminum foil, the aluminum foil is preferably disposed in a space including a hydrocarbon group-containing material, followed by heating.

In the method for producing an electrode material according to this invention, the step of heating an aluminum foil is preferably carried out at a temperature range of 450° C. to less than 660° C.

EFFECT OF THE INVENTION

As mentioned above, according to this invention, an electrode material which can secure both high electrical capacity and stability with time and an electrode material which can improve the adhesion of a conductive material that provides conductivity can be obtained. Also, if the electrode material of this invention is used to constitute the cathode foil of a nonaqueous electrolyte capacitor, a nonaqueous electrolyte electrolytic capacitor which can secure both high electrical capacity and stability with time can be obtained. Also, if the electrode material of this invention is used to constitute an electrode of a battery such as a lithium ion battery or an electrode collector, the adhesion of a conductive material that imparts conductivity can be improved.

EXPLANATION OF REFERENCE NUMERALS

1: Aluminum foil, 2: Carbon-containing layer, 3: Interposition layer (first surface part), 21: Second surface part, 22: Carbon particles, 23: Aluminum particles, 24: aluminum particles surface part, 25: Aluminum particle outside part

BEST MODE FOR CARRYING OUT THE INVENTION

Figure 1:
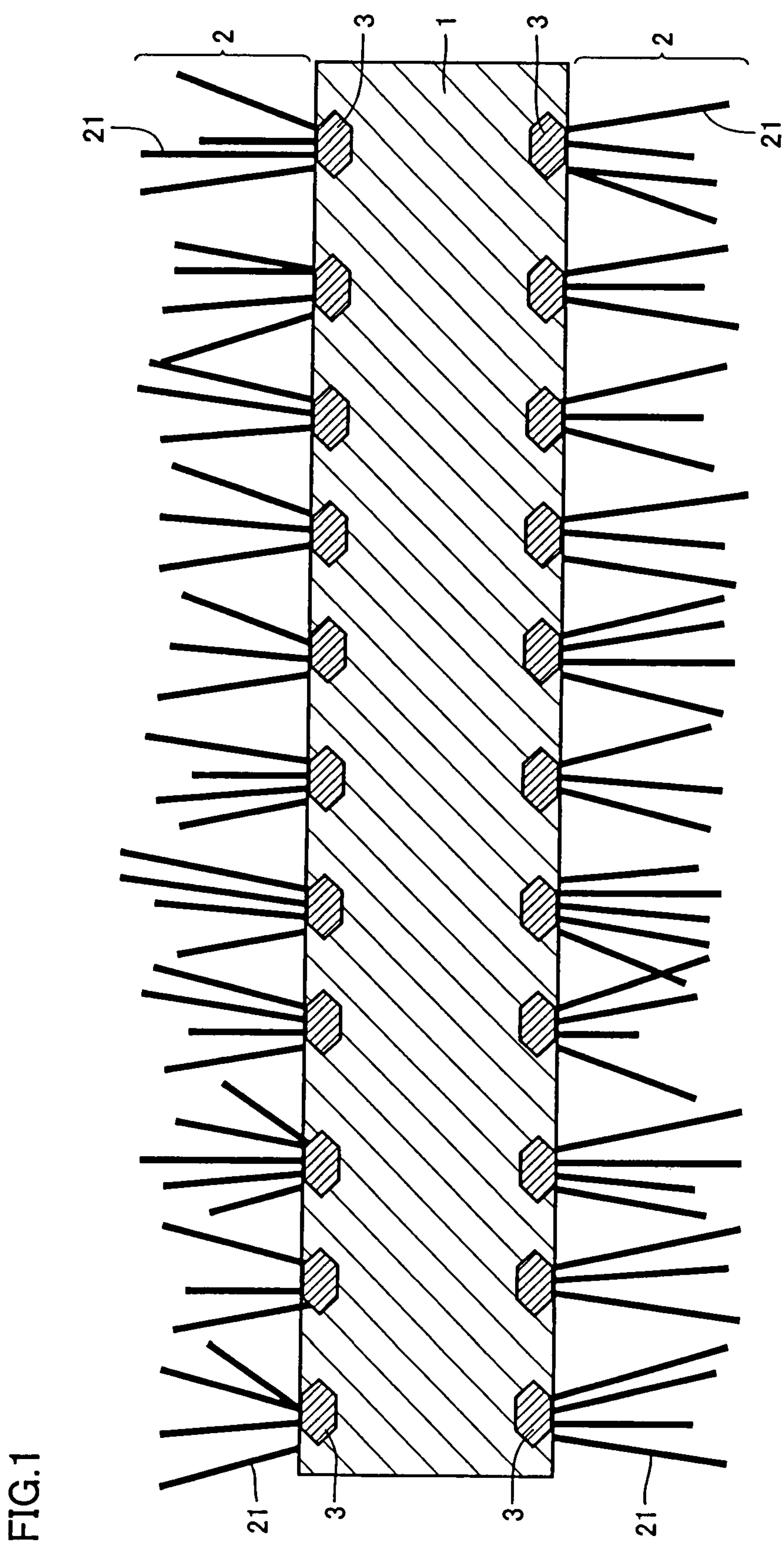
FIG. 1 is a view schematically showing the sectional structure of an electrode material in one embodiment according to this invention.

As shown in FIG. 1, according to the sectional structure of an electrode material in one embodiment according to this invention, a carbon-containing layer 2 is formed on the surface of an aluminum foil 1. An interposition layer 3 containing an aluminum element and a carbon element is formed between the aluminum foil 1 and the carbon-containing layer 2. The carbon-containing layer 2 is formed so as to extend outward from the surface of the aluminum foil 1. The interposition layer 3 constitutes a first surface part which is formed in at least a part of the surface of the aluminum foil 1 and contains a carbide of aluminum. The carbon-containing layer 2 contains a second surface part 21 formed so as to extend outward from the first surface part 3 in a fiber or filament form or in a network, cauliflower or block form, obtained by combining fiber or filament forms. The second surface part 21 is a compound of an aluminum element and a carbon element.

Figure 2:
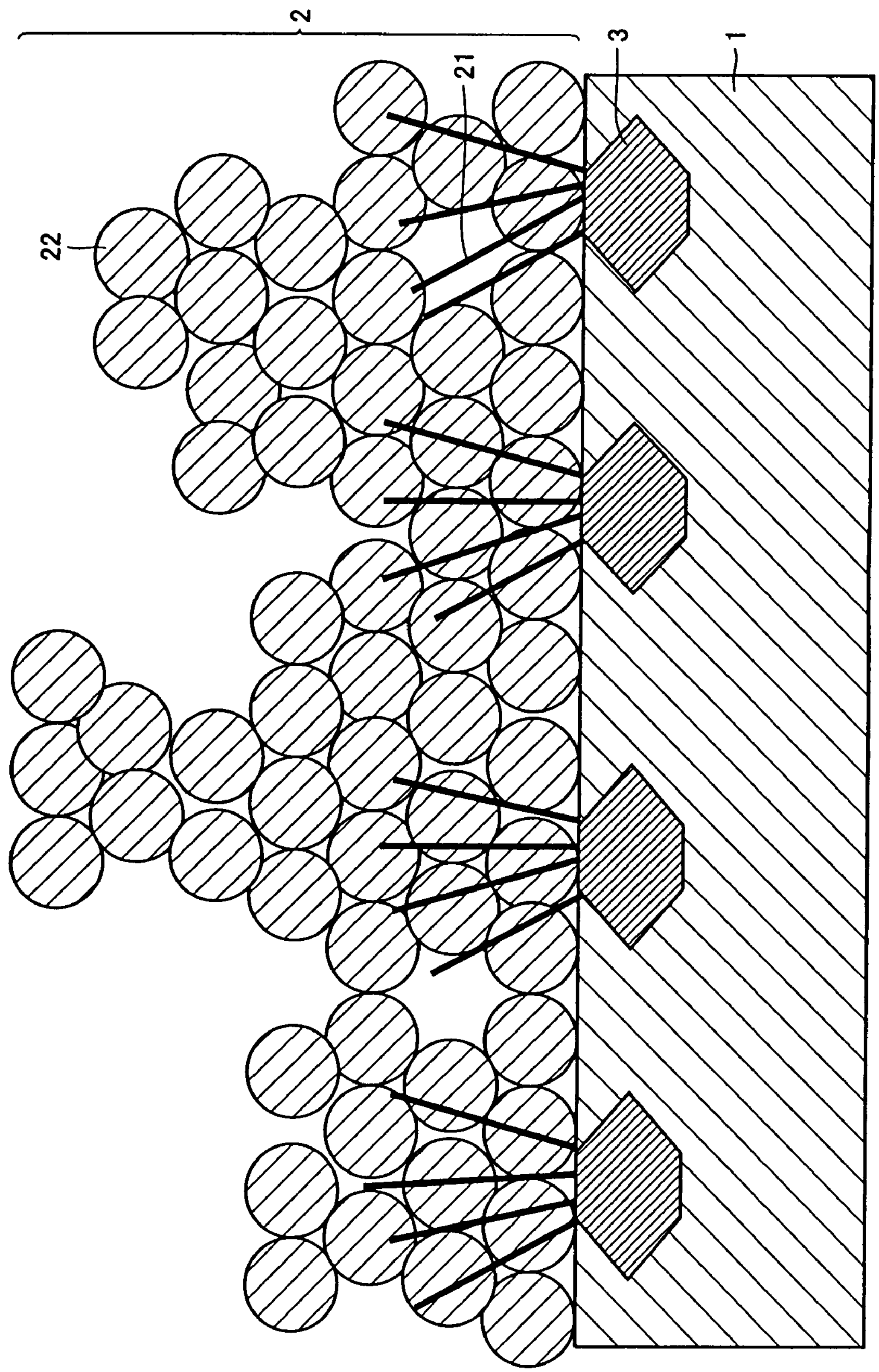
FIG. 2 is a view schematically showing the sectional structure of an electrode material in another embodiment according to this invention.

Also, as shown in FIG. 2, the sectional structure of an electrode material in another embodiment according to this invention is the same as the sectional structure shown in FIG. 1, except that the carbon-containing layer 2 further contains a large number of carbon particles 22. A second surface part 21 extends outward from the first surface part 3 in a fiber or filament form, is formed between the first surface part 3 and the carbon particles 22 and contains a carbide of aluminum. It is only required for the carbon particles 22 to be particles containing a carbon-containing material in at least the outermost layer and the carbon particles 22 may be particles of single carbon and/or particles provided with a carbon-containing material stuck to the outermost layer thereof in advance. Also, the second surface part 21 may be formed so as to extend outward from the first surface part 3 such that it covers the surface of the carbon particles 22.

Figure 3:
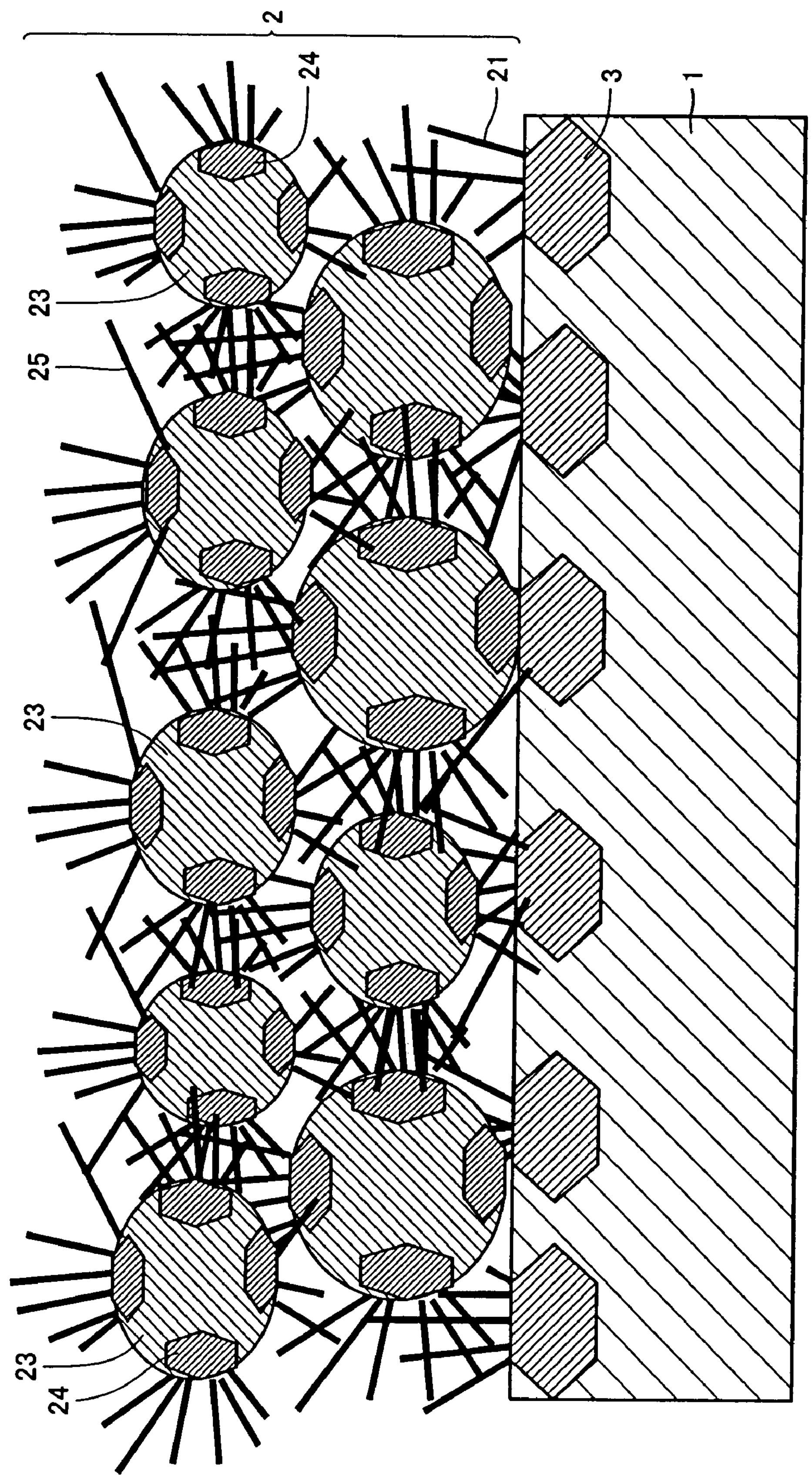
FIG. 3 is a view schematically showing the sectional structure of an electrode material in a further embodiment according to this invention.

Also, as shown in FIG. 3, the sectional structure of an electrode material in a further embodiment according to this invention is the same as the sectional structure shown in FIG. 1, except that the carbon-containing layer 2 further contains a large number of aluminum particles 23. An aluminum particle surface part 24 is formed in at least a part of the surface of the aluminum particle 23 and contains a carbide of aluminum. An aluminum particle outside part 25 is formed so as to extend to the outside of the surface of aluminum particle 23 from the aluminum particle surface part 24 in a cactus form and contains a carbide of aluminum. A second surface part 21 extends outward from the first surface part 3 in a fiber or filament form, is formed between the first surface part 3 and the aluminum particle 23 and contains a carbide of aluminum.

Figure 4:
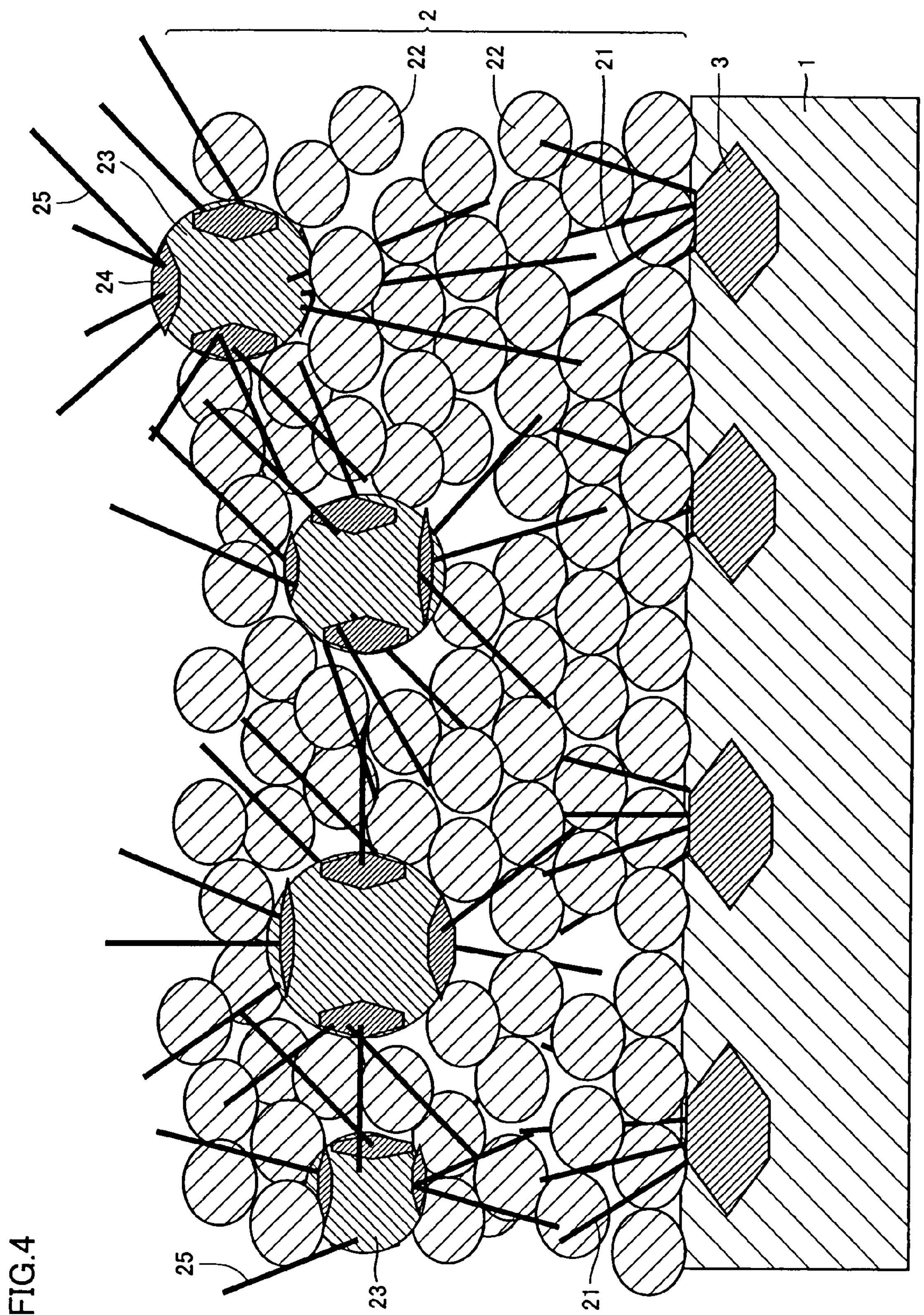
FIG. 4 is a view schematically showing the sectional structure of an electrode material in a still further embodiment according to this invention.

Also, as shown in FIG. 4, the sectional structure of an electrode material in a further embodiment according to this invention is the same as the sectional structure shown in FIG. 1, except that the carbon-containing layer 2 further contains a large number of carbon particles 22 and a large number of aluminum particles 23. A second surface part 21 extends outward from a first surface part 3 in a fiber or filament form, is formed between the first surface part 3 and carbon particles 22 and contains a carbide of aluminum. Moreover, an aluminum particle surface part 24 is formed in at least a part of the surface of the aluminum particle 23 and contains a carbide of aluminum. An aluminum particle outside part 25 is formed so as to extend to the outside of the surface of the aluminum particle 23 from the surface part 24 of the aluminum particle in a cactus form and contains a carbide of aluminum. The carbon particles 22 may be particles containing a carbon-containing material in at least the outermost layer, that is, may be particles of single carbon and/or particles provided with a carbon-containing material stuck to the outermost layer thereof in advance. Also, the second surface part 21 may be formed so as to extend outward from the first surface part 3 such that it covers the surface of the carbon particles 22.

In this embodiment of the invention, there is no particular limitation to the aluminum foil as the base material on which a carbon-containing layer is to be formed and pure aluminum or an aluminum alloy may be used for the aluminum foil. Examples of the composition of the aluminum foil to be used in the present invention include aluminum alloys to which at least one alloy element among lead (Pb), silicon (Si), iron (Fe), copper (Cu), manganese (Mn), Magnesium (Mg), chromium (Cr), zinc (Zn), titanium (Ti), vanadium (V), gallium (Ga), nickel (Ni) and boron (B) is added in a necessary range of amount and aluminum containing the above unavoidable impurity elements in a limited amount.

The thickness of the aluminum foil is designed to be in a range of 5 μm to 500 μm and particularly 10 μm to 100 μm, though no particular limitation is imposed on it.

As the above aluminum foil, one produced by a publicly known method may be used. For example, a molten bath of aluminum or an aluminum alloy having the above specified composition is prepared and cast to obtain an ingot, which is then subjected to homogenizing treatment. After that, this ingot is subjected to hot rolling and cold rolling, whereby an aluminum foil can be obtained. It is to be noted that the ingot may be subjected to intermediate annealing treatment carried out at a temperature range of 50° C. to 500° C. and particularly 150° C. to 400° C. during the course of the cold rolling process.

In one embodiment of the production method of the present invention, there is no particular limitation to the type of hydrocarbon-containing material to be used. Examples of the type of hydrocarbon-containing material include paraffinic hydrocarbons such as methane, ethane, propane, n-butane, isobutane and pentane, olefinic hydrocarbons such as ethylene, propylene, butene and butadiene and acetylenic hydrocarbons such as acetylene or derivatives of these hydrocarbons. Among these hydrocarbons, paraffinic hydrocarbons such as methane, ethane and propane are preferable because these hydrocarbons are put into a gas state in a step of heating the aluminum foil. Any one hydrocarbon among methane, ethane and propane is more preferable. Methane is a most preferable hydrocarbon.

Also, the hydrocarbon-containing material may be used in any of a liquid or gas state or the like in the production method of the present invention. It is only required for the hydrocarbon-containing material to exist in a space where the aluminum foil exists. The hydrocarbon-containing material may be introduced into the space where the aluminum foil is disposed by using any method. When the hydrocarbon-containing material is put into, for example, a gas state (for example, methane, ethane and propane), it is only necessary for the hydrocarbon-containing material to be filled either singly or together with inert gas. Also, when the hydrocarbon-containing material is a liquid, the hydrocarbon-containing material may be filled either singly or together with inert gas such that it is vaporized in the closed space.

In the step of heating the aluminum foil, there is no limitation to the pressure in the heating atmosphere and the aluminum foil may be heated under normal pressure, reduced pressure or pressure. Also, the pressure may be adjusted at any of the time when the aluminum foil is kept at a fixed heating temperature, the time when the temperature of the aluminum foil is raised to the fixed heating temperature and the time when the temperature of the aluminum foil is dropped from the fixed temperature.

The weight ratio of the hydrocarbon-containing material to be introduced into the space where the aluminum foil is heated is usually preferably in a range from 0.1 part by weight to 50 parts by weight and particularly preferably 0.5 part by weight to 30 parts by weight relative to 100 parts by weight of the aluminum foil based on carbon though no particular limitation to it.

In the step of heating the aluminum foil, the heating temperature is usually preferably in a range of 450° C. to less than 660° C. and more preferably 530° C. to 620° C. though it may be properly set according to the composition of the aluminum foil which is a heating subject and the like. However, in the production method of the present invention, the case where the aluminum foil is heated at a temperature of less than 450° C. is not excluded and it is satisfactory if the aluminum foil is heated at a temperature exceeding at least 300° C.

The heating time is usually in a range of 1 hour to 100 hours though depending on the heating time and the like.

When the heating temperature is 400° C. or more, it is preferable that the concentration of oxygen in the heating atmosphere is designed to be preferably 1.0% by volume. If the heating temperature is 400° C. or more and the concentration of oxygen in the heating atmosphere exceeds 1.0% by volume, the thermal oxidation film on the surface of the aluminum foil is thickened and there is therefore a fear that the surface resistance of the electrode material is increased.

Also, the surface of the aluminum foil may be roughened prior to heating treatment. There is no particular limitation to the surface roughing method and publicly known technologies such as washing, etching or blasting may be used.

After the carbon-containing material is made to adhere to the surface of the aluminum foil or in the case of forming a thick carbon-containing layer in the production method of the present invention, a step of heating the aluminum foil in a space including the hydrocarbon-containing material after the carbon-containing material and the aluminum powder are made to adhere to the surface of the aluminum foil is adopted.

In this case, as the carbon-containing material stuck to the surface of the aluminum foil, any of activated carbon fibers, activated carbon cloth, activated carbon felt, activated carbon powder, Indian ink, carbon black and graphite may be used. Also, carbon compounds such as silicon carbide or carbon precursors or organic compounds produced from binders by thermal decomposition may also be preferably used.

Moreover, particles provided with the carbon-containing material stuck to the outermost layer thereof in advance may be used as the carbon-containing material. The particles are not limited as long as particles which can be provided with the carbon-containing material stuck to the outermost layer thereof, however, inorganic compounds such as metal particles, oxide particles or hydroxide particles may be preferably used.

Specific examples of the metals of these metal particles include metals such as aluminum (Al), copper (Cu), silver (Ag), titanium (Ti), iron (Fe), nickel (Ni), chromium (Cr), zirconium (Zr), manganese (Mn), magnesium (Mg), lithium (Li), sodium (Na), calcium (Ca) and potassium (K) and alloys of these metals.

Examples of the oxide particles or hydroxide particles include oxides and hydroxides of one or more metals selected from the above metal particles.

As to a method of sticking the carbon-containing material to the surface of the aluminum foil in the production method of the present invention, the carbon-containing material prepared in a slurry, liquid or solid form by using a binder and a solvent, water or the like may be stuck to the surface of the aluminum foil by, for example, coating, dipping or thermo compression molding. After the carbon-containing material is made to adhere to the surface of the aluminum foil, the aluminum foil may be dried at a temperature range of 20° C. to 300° C. prior to the heat treatment.

In the production method of this invention, the carbon-containing material may contain an aluminum powder. Also, the carbon-containing material may contain a ferroelectric material or an oxide having a high dielectric constant for the purpose of raising the capacity of a electrolytic capacitor.

As to each particle to be used in the production method of this invention, any of a sphere, undefined shape, scale form and fiber form may be preferably used.

When a binder is used to make the carbon-containing material adhere to the surface of aluminum in the production method of this invention, synthetic resins such as a carboxy-modified polyolefin resin, vinyl acetate resin, vinyl chloride resin, vinyl chloride/vinyl acetate copolymer resin, vinyl alcohol resin, butyral resin, vinyl fluoride resin, acryl resin, polyester resin, urethane resin, epoxy resin, urea resin, phenol resin, acrylonitrile resin, nitrocellulose resin, paraffin wax and polyethylene wax, natural resins such as wax or tar, glue, Japanese lacquer, turpentine and honey wax or waxes are preferably used as the binder. These binders include those vaporized and those remaining as carbon precursors in the carbon-containing layer by thermal decomposition when heated though depending on the molecular weight and type of resin. The binder may be diluted with an organic solvent to adjust its viscosity.

When a binder is used to make the carbon-containing material adhere to the surface of the aluminum foil in the production method of this invention, it is preferable to carry out preheat treatment at temperature range of 100° C. to 500° C. and retention time of 5 hours or more prior to the step of heating the aluminum foil. There is no particular limitation to the atmosphere of the preheat treatment, the atmosphere may be any of a vacuum atmosphere, inert gas atmosphere and oxidizing gas atmosphere and also, the pretreatment may be carried out under normal pressure, reduced pressure or increased pressure.

In the case where the carbon-containing material and aluminum powder are made to adhere to the aluminum foil to form a thick carbon-containing layer in the production method of the present invention, the aluminum powder is preferably added in a weight ratio rang of 0.01 parts by weight to 10000 parts by weight relative to 100 parts by weight of the above carbon-containing material.

Also, the method for producing an electrode material according to this invention may further involve a step of cooling and reheating the aluminum foil, namely, a deactivating step after the above step of heating the aluminum foil in a space including the hydrocarbon-containing material.

In this case, the step of cooling and reheating the aluminum foil is preferably carried out at a temperature range of 100° C. to less than 660° C.

In the production method of the present invention, the aluminum foil may be subjected to dipping treatment carried out in a phosphoric acid solution after the step of heating the aluminum foil or the deactivating step. The stability of the electrical capacity of the electrode material of the present invention with time in a nonaqueous electrolyte is more improved by this dipping treatment. Although no particular limitation is imposed on the condition of the dipping treatment, the aluminum foil may be dipped in a phosphoric acid solution having a concentration of 0.01 mol or more and 5 mol or less at 30° C. or more and 100° or less for 10 seconds or more. Also, the aluminum foil may be dried after the dipping treatment.

Also, when the electrode material of the present invention is used as a capacitor anode foil, anodic oxidation treatment may be carried out after the step of heating the aluminum foil or the deactivating step. Although no particular limitation is imposed on the condition of the anodic oxidation treatment, the anodic oxidation treatment may be carried out in a boric acid solution at a temperature of 30° C. or more and 100° C. or less under a current of about 10 $mA/cm^2$ or more and 400 $mA/cm^2$ or less for 5 minutes or more.

In an electrolytic capacitor using the electrode material according to this invention, a nonaqueous electrolyte is used. The content of water contained in the electrolyte is 5% by volume or less, preferably 1% by volume or less and more preferably 0.5% by volume or less.

Besides cyclic carboxylates such as γ-butyrolactone and γ-valerolactone and their derivatives, cyclic carbonates such as ethylene carbonate, propylene carbonate, butylene carbonate and vinylene carbonate and their derivatives, chain carbonates such as dimethyl carbonate, diethyl carbonate and ethymethyl carbonate and their derivatives, aliphatic carboxylates such as methyl formate, methyl acetate, methyl propionate and ethyl propionate and their derivatives, chain ethers such as dimethoxymethane, diethyl ether, 1,2-dimethoxyethane, 1,2-diethoxyethane, ethoxymethoxyethane and 1,3-dimethoxypropane and their derivatives, cyclic ethers such as tetrahydrofuran, 2-methyltetrahydrofuran and 1,3-dioxolan and their derivatives, dimethylsulfoxide, 1,3-dioxolan, formamide, acetamide, dimethylformamide, dioxolan, acetonitrile, propylnitrile, nitromethane, ethylmonogrime, triphosphate, trimethoxymethane, dioxolan derivatives, sulfolane, methylsulfolane, 1,3-dimethyl-2-imidazolidinone, 3-methyl-2-oxazolidinone, ethyl ether, 1,3-propanesalton, anisole, dimethylsulfoxide, N-methylpyrrolidone and the like are preferably used as the solvent used in the nonaqueous electrolyte. These compounds may be used either singly or in combinations of two or more.

The concentration of the solute in the nonaqueous electrolyte is, though not particularly limited to, preferably 0.2 to 2 mol/l and more preferably 0.5 to 1.5 mol/l.

As the solute contained in the nonaqueous electrolyte, an organic alkylammonium carboxylate, organic amidium carboxylate or the like are used though there is no particular limitation to it. In this case, the organic carboxylic acid is maleic acid, phthalic acid and the like.

The nonaqueous electrolyte can be improved in dielectric strength by adding boric acid, a complex compound of boric acid and polysaccharides (for example, mannitol and sorbitol), a complex of boric acid and a polyhydric alcohol (for example, ethylene glycol and glycerin), a surfactant and colloidal silica. An aromatic nitro compound such as p-nitrobenzoic acid and p-nitrophenol, phosphorous-containing compound such as phosphoric acid, phosphorous acid, polyphosphoric acid and acidic phosphate and an oxycarboxylic acid compound may be added to the electrolyte.

If the electrode material of the present invention is used for a cathode, the nonaqueous electrolyte electrolytic capacitor is constituted of a cathode foil made of the electrode material of the present invention, an anode foil having a dielectric layer, a separator interposed between the above anode foil and cathode foil and a nonaqueous electrolyte. The anode foil and cathode foil laminated through the separator are coiled to form a capacitor element, which is then impregnated with the nonaqueous electrolyte. The capacitor element impregnated with the nonaqueous electrolyte is put in an outer package casing and the casing is sealed by an entrance sealing body to thereby obtain an electrolytic capacitor.

As the anode foil, for example, an aluminum foil is used. In order to form a dielectric layer on the anode foil, it is only required that the anode foil is, for example, etched to enlarge the surface area of the anode foil and then, a voltage of 300 to 600 V is applied in boric acid. An oxide film which is to be a dielectric is formed on the anode foil. As the separator, nonwoven fabric or woven fabric made of craft pulp is used.

EXAMPLES

Electrode materials were produced in the following Conventional Example and Examples 1 to 20. In Reference Example, an aluminum foil coated with carbon was produced to compare with Examples.

Conventional Example

A 40-μm-thick aluminum foil (JIS A1080-H18) was subjected to a.c. etching treatment carried out in an electrolyte containing 15% of hydrochloric acid and 0.5% of sulfuric acid under the condition of a temperature of 50° C. and a current density of 0.4 $A/cm^2$ for 60 seconds. The etched aluminum foil was washed with water and dried to form an electrode material.

Example 1

Two parts by weight of carbon black having an average particle diameter of 0.5 μm was mixed with 1 part by weight of an acrylic binder and the mixture was dispersed in a solvent (toluene) to obtain a coating solution having a solid content of 30%. This coating solution was applied to both surfaces of an aluminum foil (JIS A1050-H18) having a thickness of 30 μm and dried. The thickness of the coating film formed on each surface was 1 μm after the film was dried. This aluminum foil was kept at 590° C. in a methane gas atmosphere for 10 hours to manufacture an electrode material.

Example 2

Two parts by weight of alminium powder having an average particle diameter of 1 μm was mixed with 1 part by weight of an acrylic binder and the mixture was dispersed in a solvent (toluene) to obtain a coating solution having a solid content of 30%. This coating solution was applied to both surfaces of an aluminum foil (JIS 1N30-H18) having a thickness of 15 μm and dried. The thickness of the coating film formed on each surface was 2 gm after the film was dried. This aluminum foil was kept at 620° C. in a methane gas atmosphere for 10 hours to manufacture an electrode material.

Examples 3 to 10

Two parts by weight of carbon black having an average particle diameter of 0.1 μm and 2 parts by weight of an aluminum powder having an average particle diameter of 1 μm were mixed with an acrylic binder and the mixture was dispersed in a solvent (toluene) to obtain a coating solution having a solid content of 30%. This coating solution was applied to both surfaces of an aluminum foil (JIS A3003-H18) having a thickness of 12 μm and dried. The thickness of the coating film formed on each surface was 4 μm after the film was dried. This aluminum foil was heat-treated in the condition shown in Table 1. Deactivating treatment was carried out at 300° C. in the air for 2 hours after the heat treatment in Example 8. The aluminum foil was subjected to preheat treatment carried out at 400° C. in the air for 10 hours before the heat treatment in Example 9. In Example 10, after the heating treatment, the aluminum foil was subjected to dipping treatment carried out at 50° C. in a phosphoric acid solution containing 2 mol of phosphoric acid for 30 seconds and dried at 100° C. for 5 minutes. Electrode materials were thus manufactured.

Example 11

2 Parts by weight of carbon black having an average particle diameter of 0.5 μm was mixed with 1 part by weight of polyvinyl alcohol and the mixture was dispersed in a solvent (toluene) to obtain a coating solution having a solid content of 30%. This coating solution was applied to both surfaces of an aluminum foil (JIS A1050-H18) having a thickness of 30 μm and dried. The thickness of the coating film formed on each surface was 1 μm after the film was dried. This aluminum foil was kept at 590° C. in a methane gas atmosphere for 10 hours to manufacture an electrode material.

Example 12

Two parts by weight of an aluminum powder having an average particle diameter of 1 μm was mixed with 1 part by weight of polyvinyl alcohol and the mixture was dispersed in a solvent (toluene) to obtain a coating solution having a solid content of 30%. This coating solution was applied to both surfaces of an aluminum foil (JIS 1N30-H18) having a thickness of 15 μm and dried. The thickness of the coating film formed on each surface was 2 μm after the film was dried. This aluminum foil was kept at 620° C. in a methane gas atmosphere for 10 hours to manufacture an electrode material.

Examples 13 to 16

Carbon was vapor-deposited on the particles shown in Table 2. The average thickness of the deposited layer was 0.5 μm. Two parts by weight of these particles were mixed with 1 part by weight of an acrylic binder and the mixture was dispersed in a solvent (toluene) to obtain a coating solution having a solid content of 30%. This coating solution was applied to both surfaces of an aluminum foil (JIS A3003-H18) having a thickness of 20 μm and dried. The thickness of the coating film formed on each surface was 2.5 μm after the film was dried. This aluminum foil was kept at 590° C. in a methane gas atmosphere for 10 hours to manufacture an electrode material.

Examples 17 to 20

One part by weight of the particles shown in Table 2 were mixed with 1 part by weight of a butyral resin and the mixture was heat-treated at 300° C. in the air for 15 hours.

Two parts by weight of the obtained particles were mixed with 1 part by weight of an acrylic binder and the mixture was dispersed in a solvent (toluene) to obtain a coating solution having a solid content of 30%. This coating solution was applied to both surfaces of an aluminum foil (JIS 1N30-H18) having a thickness of 15 μm and dried. The thickness of the coating film formed on each surface was 2 μm after the film was dried. This aluminum foil was kept at 620° C. in a methane gas atmosphere for 10 hours to manufacture an electrode material.

Reference Example

Two parts by weight of carbon black having an average particle diameter of 0.1 μm and 2 parts by weight of an aluminum powder having an average particle diameter of 1 μm were mixed with an acrylic binder and the mixture was dispersed in a solvent (toluene) to obtain a coating solution having a solid content of 30%. This coating solution was applied to both surfaces of an aluminum foil (JIS A3003-H18) having a thickness of 12 μm and dried. The thickness of the coating film formed on each surface was 4 μm after the film was dried. This aluminum foil was heat-treated at 500° C. in argon gas. An electrode material coated with carbon was thus manufactured.

The characteristics of each sample obtained in the above Conventional Example, Examples 1 to 20 and Reference Example were measured as follows. The results are shown in Table 1.

(1) Electrical Capacity

The electrical capacity of each sample was measured in an aqueous ammonium adipate solution (150 g/L) by a LCR meter and expressed by an index when the value obtained in Conventional Example was set to 100.

(2) Stability with Time

To a solvent primarily containing γ-butyrolactone, 15& by weight of tetraethylammonium phthalate was added to prepare a nonaqueous electrolyte. Each sample was dipped in the nonaqueous electrolyte at 85° C. for 5000 hours and then, the electrical capacity was measured to express it by an index when the electrical capacity before the sample was dipped was set to 100.

(3) Adhesion

The sample was dipped in a 1 mol hydrochloric acid solution kept at 80° C. to visually measure the time required until the carbon-containing layer is completely peeled from the surface of the aluminum foil.

TABLE 1

| | Heat treatment | | | | | |
|---|---|---|---|---|---|---|
| | Atmosphere | Temperature (° C.) | Time (Hr) | Electrical Capacity (%) | Stability with time (%) | Adhesion (sec) |
| Example 1 | Methane gas | 590 | 10 | 156 | 98 | 90 |
| Example 2 | Methane gas | 620 | 10 | 195 | 100 | 90 |
| Example 3 | Acetylene gas | 440 | 60 | 102 | 100 | 30 |
| Example 4 | Acetylene gas | 490 | 10 | 107 | 101 | 70 |
| Example 5 | Methane gas | 540 | 10 | 227 | 97 | 110 |
| Example 6 | Methane gas | 590 | 10 | 348 | 86 | 120 |
| Example 7 | Methane gas | 640 | 10 | 414 | 85 | 150 |
| Example 8 | Methane gas | 540 | 10 | 303 | 91 | 100 |
| Example 9 | Methane gas | 540 | 10 | 205 | 99 | 120 |
| Example 10 | Methane gas | 540 | 10 | 390 | 98 | 100 |
| Example 11 | Methane gas | 590 | 10 | 250 | 98 | 80 |
| Example 12 | Methane gas | 620 | 10 | 230 | 100 | 90 |
| Reference Example | — | — | — | 11 | 92 | 20 |
| Conventional Example | — | — | — | 100 | 82 | — |

TABLE 2

| | Particles (average particle diameter [μm]) | Electrical Capacity (%) | Stability with time (%) | Adhesion (sec) |
|---|---|---|---|---|
| Example 13 | Aluminum (1.0) | 154 | 98 | 110 |
| Example 14 | Aluminum oxide (2.0) | 124 | 97 | 70 |
| Example 15 | Nickel (2.0) | 131 | 99 | 80 |
| Example 16 | Activated carbon (2.0) | 278 | 99 | 90 |
| Example 17 | Aluminum (1.0) | 220 | 100 | 80 |
| Example 18 | Aluminum oxide (2.0) | 160 | 98 | 70 |
| Example 19 | Nickel (2.0) | 150 | 97 | 70 |
| Example 20 | Activated carbon (2.0) | 500 | 98 | 80 |
| Reference Example | — | 11 | 92 | 2 |
| Conventional Example | — | 100 | 82 | — |

It is understood from the results of Table 1 that the electrode materials of Examples 1 to 12 each exhibit a higher electrical capacity and also higher stability with time than the electrode material of Conventional Example. Also, Reference Example exhibits higher stability with time but a lower electrical capacity and lower adhesion than Conventional Example. Specifically, it is understood that if a nonaqueous electrolyte electrolytic capacitor is constituted using the electrode material of the present invention, a high electrical capacity and high stability with time can be both secured.

In Examples 1 to 12, the carbon-containing layers containing carbon particles, aluminum particles or carbon particles and aluminum particles are formed on the surface of the aluminum foils. However, even if a carbon-containing layer containing neither carbon particles nor aluminum particles is formed on the aluminum foil, the obtained electrode material exhibits a higher electrical capacity and higher stability with time than the electrode material of Conventional Example and also exhibits higher adhesion than that of Reference Example.

Examples 13 to 20 show examples in which a carbon-containing layer containing particles provided with a carbon-containing material stuck to the outermost layer in advance is formed on the aluminum foil. It is found from the results in Table 2 that these examples respectively exhibit a higher electrical capacity and higher stability with time than the electrode material of Conventional Example and also exhibits higher adhesion than that of Reference Example.

The foregoing embodiments and examples disclosed above are considered to be illustrative and should not be interpreted as restrictive in all points. The scope of the invention is defined not by the foregoing embodiments and examples but by the claims, and embraces all changes and modifications that fall within the claims or equivalence.

INDUSTRIAL APPLICABILITY

A cathode foil of a nonaqueous electrolyte electrolytic capacitor can be constituted by using the electrode material according to this invention. Also, the electrode material according to this invention may be used for a capacitor anode foil besides a capacitor cathode foil. The electrode material according to this invention may also be used for electrode foils or electrode collector foils which are used in lithium batteries, lithium ion batteries, lithium ion polymer batteries, dye light-sensitive solar cells and electric double-layer capacitors. The electrode material according to this invention may be used for electrode plates or electrode collector plates which are used in fuel cells and solid polymer fuel cells.

The invention claimed is:

1. An electrode material comprising:

an aluminum foil, a carbon-containing layer formed on the surface of said aluminum foil, and an interposition layer containing an aluminum element and a carbon element formed between said aluminum foil and said carbon-containing layer, wherein said carbon-containing layer being formed so as to extend outward from the surface of said aluminum foil, wherein said interposition layer comprises a first surface part formed in at least a part of the surface of said aluminum foil, and containing a carbide of aluminum; and said carbon containing layer comprises a second surface part formed so as to extend in a fiber or filament form outward from said first surface part said carbon containing layer further comprises particles containing a carbon containing material in at least an outermost layer thereof and said second surface part is formed between said first surface part and said particles and contains a carbide of aluminum.

2. The electrode material according to claim 1, wherein said carbon-containing layer comprises an interposition material having an aluminum element and a carbon element inside.

3. The electrode material according to claim 1, wherein said particles are selected from the group consisting of carbon particles and particles provided with a carbon-containing material disposed on the outermost layer thereof.

4. The electrode material according to claim 1, wherein said carbon-containing layer further comprises aluminum particles, an aluminum particle surface part formed in at least a part of surface of said aluminum particles and containing a carbide of aluminum and an aluminum particle outside part formed so as to extend from said aluminum particle surface part to an outside of the surface of said aluminum particles and containing a carbide of aluminum.

5. The electrode material according to claim 1, wherein said carbon-containing layer further comprises aluminum particles, an aluminum particle surface part formed in at least a part of surface of said aluminum particles and containing a carbide of aluminum and an aluminum particle outside part formed so as to extend from said aluminum particle surface part to an outside of the surface of said aluminum particles and containing a carbide of aluminum, and said second surface part is formed between said first surface part and said aluminum particles and contains a carbide of aluminum.

6. The electrode material according to claim 1, said electrode material being a capacitor cathode foil.

7. The electrode material according to claim 6, wherein, said capacitor cathode foil is used for a nonaqueous electrolyte electrolytic capacitor.

* * * * *